A. B. HERRICK.
ELECTRODE FOR WELDING.
APPLICATION FILED NOV. 29, 1912.
1,106,347.
Patented Aug. 4, 1914.
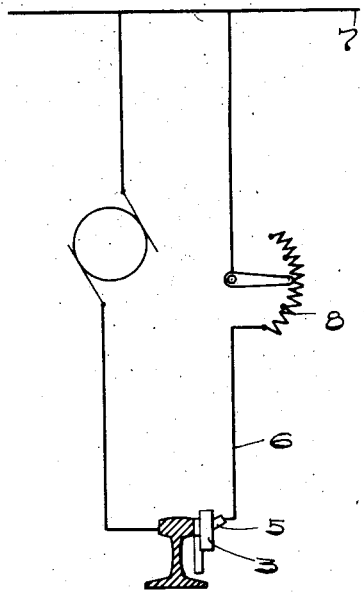
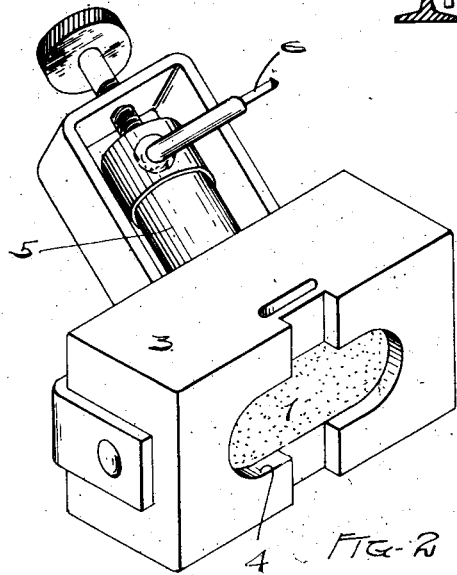
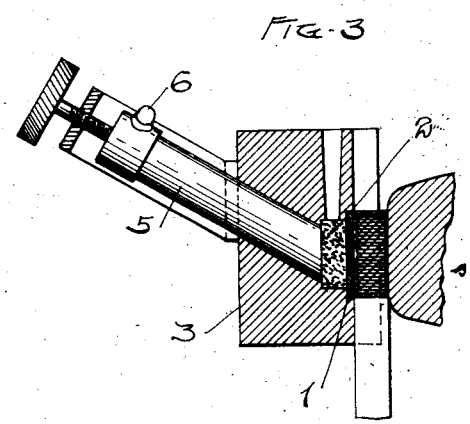
WITNESSES=
Oliver M. Kappler
H. M. Kathe.
INVENTOR
Albert B. Herrick
BY Fay and Oberlin
ATTORNEYS

UNITED STATES PATENT OFFICE.

ALBERT B. HERRICK, OF NEW YORK, N. Y., ASSIGNOR TO THE ELECTRIC RAILWAY IMPROVEMENT COMPANY, OF CLEVELAND, OHIO, A CORPORATION OF OHIO.

ELECTRODE FOR WELDING.

1,106,347.  Specification of Letters Patent.  Patented Aug. 4, 1914.

Application filed November 29, 1912. Serial No. 733,973.

*To all whom it may concern:*

Be it known that I, ALBERT B. HERRICK, a citizen of the United States, and a resident of New York, county of New York and State of New York, have invented a new and useful Improvement in Electrodes for Welding, of which the following is a specification, the principle of the invention being herein explained and the best mode in which I have contemplated applying that principle, so as to distinguish it from other inventions.

In the use of electrodes for the purpose of producing welding temperatures, as for example, in the method of making homeogeneous mechanical junctures described in U. S. Letters Patent No. 1,012,077, issued to me December 19, 1911, it is highly desirable to avoid having an arc play between the electrode and the article being heated where such article is of the low fusing character of the bond referred to specifically in said patent. There is a tendency, however, for the current to thus arc across even at relatively low voltage incidentally to bringing up the electrode into proximity with the terminal; while with a direct current at the relative high voltage ordinarily employed, for example, in electric railway operation, it has been found quite out of the question to utilize such current for heating the welding electrode without first transforming the same and stepping it down.

The object of the present invention is to provide an electrode in which not only may the tendency to arc be eliminated where the low voltage at present in use is employed, but also render it possible to satisfactorily use a much higher voltage than is at present employed in connection with such patented process or in prevailing methods of bonding by the use of electrically generated heat. To the accomplishment of this and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—Figure 1 is a diagrammatic representation of an apparatus, including my improved electrode, arranged for "bonding," that is, for welding bonds onto steel rails, using the regular trolley current; Fig. 2 is a perspective view of said electrode; and Fig. 3 is a transverse cross-section thereof.

Referring to the several figures of the drawing and especially Fig. 3, the electrode therein illustrated will be seen to differ from the previous substantially solid electrode of uniform composition throughout, in that it is built up of two bodies or members of diverse materials, one body 1 designed for contacting with the bond and the other body 2 backing such first body. The latter is preferably composed of granular material and is held in a suitable holder 3 of insulating material, that forms the main support for the body 1 that directly contacts with the bond, as well. This contacting body, on the contrary, is formed in a compact or solid mass and corresponds more nearly with the electrode as at present constructed. It is desirable, however, that it have a higher specific resistance than the charging or backing material, and to this end the chief constitutent of the former is amorphous carbon, while that of the latter is graphitic-carbon.

A satisfactory formula for the composition of the charging mixture has been found by experiment to be as follows, viz., 25 parts of flaked graphite, 10 parts of French chalk and 10 parts of fullers' earth mixed with molasses, baked until the latter is carbonated, and then ground into a granular state. Similarly a recommended formula for the composition of the contact plate of the electrode is 10 parts of carbon (medium granulated), six parts of powdered asbestos, one part of silicate of sodium and two parts of water. To these ingredients may be added more of less fullers' earth in order to vary the resistance. The ingredients after mixing and being molded into the desired shape are baked, thereby producing a solid plate. It will be understood that the parts specified for the ingredients in the formulæ just given are measured by weight. The two distinctive elements or ingredients in the respective parts of the electrode being graphitic and amorphous carbon, the one will disrupt the arc in the other, the charging or backing material having the lower specific resistance.

In employing the foregoing electrode in welding, as for example in welding a bond onto a steel rail, the terminal of the bond is held against the rail face at the desired point of junction, by bringing up the electrode and pressing the same against said terminal. The face of the electrode thus pressed against the bond is preferably recessed, as at 4, to partially receive the bond terminal and conform it to the desired shape after fusion occurs. The plate-like body 1 will then lie at the back of this recess, the mass 2 of granular material back of said plate being packed with such pressure as is desired by a plug-like conductor member 5 with which the lead 6 supplying the current is connected. This lead is brought direct from the trolley 7, or other source of current with similar voltage, with only a simple regulating resistance 8 interposed.

In further explanation of the action involved in the operation of the foregoing apparatus, it may be stated that the physical characteristics of the material used in the conduction of current for heating purposes have marked effect on the form this energy absorption in the resistance medium will take. When the energy losses are low, due to the high conductivity of the medium, only a slow rise in temperature will occur; but, where the resistance of the medium to the flow of the current is greater, the amount of energy absorbed, and the rate of increase in the temperature of the body due to such absorption, are both correspondingly increased. The absorption of such energy becomes apparent by the increasing luminosity of the resistance medium, and at this temperature such energy absorption becomes useful in breaking down the mechanical structure of metal to be welded and in raising to a melting point bodies, such as metals, in contact with the heating surface thus provided, so that such resistance medium may be utilized as a means for fusing such contacting metallic body or for welding or homogeneously joining the same to another body. Certain difficulties, however, arise when a current of small volume and high potential is used for the purpose of supplying to such resistance or heating medium the necessary energy for bringing the latter to the desired temperature, and so far as advised it has never heretofore been found feasible in practice at least to utilize a current of this sort in heating a welding electrode of any considerable area, or in producing thereby a junction between metallic bodies which might truly be called homogeneous. The normal action of a resistance medium, when heated by a current of large volume and low potential, is to come up to a state of incandescence without a breakdown of its material structure, there being in such case insufficient potential between adjacent particles of the medium to break down their chemical union with the resultant formation of a gas, or in other words the volatilization of the medium, such volatilization producing what is known as an arcing effect. On the contrary, the conditions are present for such a change in the constitution of the medium and the production of an arc, when the potential drop across the resistance medium is large, so that sufficient potential or energy may occur between adjacent particles or molecules in such medium to effect their dissociation into a gas. When this once starts in a medium, a general breaking down occurs in portions thereof in which migration takes place along lines parallel to the flow of current through the medium and arcing paths are thus literally punctured through the medium. The energy manifestation of the current is then changed in its character, such energy being dissipated in these limited channels where the break-down in the material has occurred, boiling or volatilizing the material directly affected, while the temperature of the electrode as a whole falls, since the arcing paths present relatively lower resistance for the conduction of the current than do the remaining portions of the electrode. By the improved construction of electrode, however, hereinbefore described, a resistance medium is provided which will obviate the harmful results just noted as occurring when a current of high potential is utilized in connection with an ordinary electrode. By constructing the electrode of laminæ disposed transversely, that is substantially at right angles to the direction of current flow through the electrode, which laminæ differ either in their physical character, or in their composition, or in both these particulars, as in the case of the specific construction hereinbefore described, the harmful arcing within the medium will not occur to defeat the purpose of the operation. It is thus rendered possible to utilize a high tension current for welding without reducing such current to a lower potential and greater volume, as has heretofore been necessary.

The general character of the resistance medium to be employed in the construction of the electrode in order to suit it for such use is the one just stated above, viz., that the electrode be laminated transversely of the direction of flow of the current therethrough. It has been found that certain elements lend themselves readily to the creation of arcing within the medium, silica and aluminum oxid apparently having the most marked influence in tending to form incipient arcs and facilitating their growth, whereas limes, clay and carbonaceous materials have been found to present greater resistance to this effect. Further, I have found that where the resistance medium is of uniform composition throughout, even though composed of heterogeneous elements, arcing is apt to result with the high potential current before the welding process can be properly accomplished, and it will be understood that the arcing, even though it occurs late in the operation and after the weld has been partially completed, is apt to have a disastrous result, burning up the fused or semi-fused metal, and destroying the homogeneous character of the juncture so as to reduce its electrical conductivity in a marked degree. However, by utilizing different combinations of materials in the construction of the electrode and disposing these in more or less distinct layers or laminæ extending transversely with respect to the line of flow of the current, and furthermore making the physical character of such layers different, as for example making the one a solid mass and the other of granular composition, this tendency to form arcs is substantially entirely eliminated, even with a current of the voltage regularly employed in the operation of electric railways, and the application of such current directly to the bonding operation hereinbefore described rendered possible. It is, of course, not intended by the specific reference just made to this one field of use, to imply that the principle of operation involved is not susceptible of much wider application in the art of welding or heating by means of the electric current, nor is it meant to imply that the specific formulæ given for the composition of the two layers or strata, of which the electrode has been described as consisting, are the only formulæ which may be used, these merely being the ones which have been found to give the best results in the course of a number of experiments with various elements.

Other modes of applying the principle of my invention may be employed instead of the one explained, change being made as regards the mechanism herein disclosed, provided the means stated by any of the following claims or the equivalent of such stated means be employed. I therefore particularly point out and distinctly claim as my invention:—

1. As a new article of manufacture, a welding electrode of laminated structure, the laminæ being disposed transversely of the line of current flow through said electrode.

2. As a new article of manufacture, a welding electrode comprising laminæ disposed transversely of the line of current flow through said electrode, such laminæ being of different physical character.

3. As a new article of manufacture, a welding electrode comprising laminæ disposed transversely of the line of current flow through said electrode, one of said laminæ being of relatively solid, the other of granular, character.

4. As a new article of manufacture, a welding electrode comprising laminæ disposed transversely of the line of current flow through said electrode, the one of said laminæ designed to contact with the article to be welded being of relatively solid, the other of granular, character.

5. As a new article of manufacture, a welding electrode comprising laminæ disposed transversely of the line of current flow through said electrode, such laminæ being of unlike chemical composition.

6. As a new article of manufacture, a welding electrode comprising laminæ disposed transversely of the line of current flow through said electrode, one of said laminæ having a higher specific resistance than the other.

7. As a new article of manufacture, a welding electrode comprising laminæ disposed transversely of the line of current flow through said electrode, one of said laminæ having as its chief constituent amorphous carbon, the other having as its chief constituent graphitic carbon.

8. As a new article of manufacture, a welding electrode comprising laminæ disposed transversely of the line of current flow through said electrode, the one of said laminæ designed to contact with the article to be welded having as its chief constituent amorphous carbon, the other having as its chief constituent graphitic carbon.

9. As a new article of manufacture, a welding electrode comprising a holder of insulating material, a plate of solid resistance material secured in said holder so as to be adapted to contact with the article to be welded, a body of granular resistance material back of and in contact with said plate; and connections for passing an electric current through said body of granular material and plate.

10. As a new article of manufacture, a welding electrode comprising a holder of insulating material provided with a recess in its face adapted to receive the article to be welded, a plate of resistance material secured in said holder and forming the rear wall of such recess, a body of granular resistance material back of and in contact with said plate; and connections for passing an electric current through said body of granular material and plate.

Signed by me this 26th day of November, 1912.

ALBERT B. HERRICK.

Attested by—
D. L. DAVIES,
JNO. F. OBERLIN.